United States Patent
Hu et al.

(10) Patent No.: US 11,910,495 B2
(45) Date of Patent: Feb. 20, 2024

(54) CONDUCTIVE INK WITH ENHANCED MECHANICAL FATIGUE RESISTANCE

(71) Applicant: GOODRICH CORPORATION, Charlotte, NC (US)

(72) Inventors: Jin Hu, Hudson, OH (US); Casey Slane, Tallmadge, OH (US); Nathaniel Ching, Hartville, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 683 days.

(21) Appl. No.: 16/713,475

(22) Filed: Dec. 13, 2019

(65) Prior Publication Data

US 2021/0185767 A1 Jun. 17, 2021

(51) Int. Cl.
*H05B 3/14* (2006.01)
*B64D 15/12* (2006.01)
(Continued)

(52) U.S. Cl.
CPC ............. *H05B 3/145* (2013.01); *B64D 15/12* (2013.01); *C09D 11/037* (2013.01);
(Continued)

(58) Field of Classification Search
CPC ........ H05B 3/145; H05B 1/0236; H05B 3/03; H05B 3/32; H05B 2203/013; H05B 2203/017; H05B 2203/02; H05B 3/262; H05B 3/34; H05B 2214/02; H05B 2214/04; H05B 3/20; B64D 15/12; B64D 2221/00; C09D 11/037; C09D 11/102; C09D 11/52
See application file for complete search history.

(56) References Cited

U.S. PATENT DOCUMENTS 5,804,797 A * 9/1998 Kaimoto .................. H01C 7/02
219/505
5,922,233 A * 7/1999 Ohashi .................. H05B 3/565
219/528
(Continued)

FOREIGN PATENT DOCUMENTS

CN 1663002 8/2005
EP 1544869 6/2005
(Continued)

OTHER PUBLICATIONS

European Patent Office, European Partial Search Report dated May 11, 2021 in Application No. 20213795.6.
(Continued)

*Primary Examiner* — Thien S Tran
(74) *Attorney, Agent, or Firm* — SNELL & WILMER L.L.P

(57) ABSTRACT

A conductive ink may comprise a high temperature thermoplastic polyurethane (TPU) and a plurality of conductive particles disposed in the high temperature TPU. The plurality of conductive particles may comprise between 60% and 95% of the conductive ink by weight. The high temperature TPU may include a melting point between 120° C. and 200° C. The conductive ink may be used for external heated composite structures, such as rotor blades, fixed wings, faring, engine lip electrothermal ice protection, or the like. The conductive ink may have enhanced mechanical fatigue resistance.

11 Claims, 8 Drawing Sheets

(51) Int. Cl.
  *C09D 11/037* (2014.01)
  *C09D 11/102* (2014.01)
  *C09D 11/52* (2014.01)
  *H05B 1/02* (2006.01)
  *H05B 3/03* (2006.01)
  *H05B 3/32* (2006.01)

(52) U.S. Cl.
  CPC .......... *C09D 11/102* (2013.01); *C09D 11/52* (2013.01); *H05B 1/0236* (2013.01); *H05B 3/03* (2013.01); *H05B 3/32* (2013.01); *B64D 2221/00* (2013.01); *H05B 2203/013* (2013.01); *H05B 2203/017* (2013.01); *H05B 2203/02* (2013.01)

(56) References Cited

U.S. PATENT DOCUMENTS

| | | | |
|---|---|---|---|
| 6,537,359 B1 | 3/2003 | Spa | |
| 8,367,987 B2* | 2/2013 | Ishii | H05B 3/342 |
| | | | 219/545 |
| 9,994,325 B2 | 6/2018 | Hu | |
| 10,155,593 B2* | 12/2018 | Burton | H01Q 1/368 |
| 2010/0300618 A1* | 12/2010 | Frackmann | C08G 18/4202 |
| | | | 977/932 |
| 2011/0186329 A1* | 8/2011 | Makal | C08G 18/68 |
| | | | 264/494 |
| 2015/0083863 A1 | 3/2015 | Karthauser et al. | |
| 2016/0035456 A1* | 2/2016 | Sauro | H01B 1/24 |
| | | | 252/511 |
| 2016/0264809 A1 | 9/2016 | Xiao et al. | |
| 2016/0374147 A1* | 12/2016 | Song | H05B 3/10 |
| 2017/0016421 A1* | 1/2017 | Øen | F02N 19/10 |
| 2018/0222135 A1 | 8/2018 | Dias Borges Vianna et al. | |
| 2020/0015325 A1* | 1/2020 | Zhao | H05B 3/06 |
| 2020/0115059 A1* | 4/2020 | George | H05B 3/145 |

FOREIGN PATENT DOCUMENTS

| | | |
|---|---|---|
| WO | 2018089645 | 5/2018 |
| WO | 2019128484 | 7/2019 |

OTHER PUBLICATIONS

European Patent Office, European Search Report dated Sep. 23, 2021 in Application No. 20213795.6.

Chinese Patent Office, Chinese Office Action dated Jun. 8, 2023 in Application No. 202011441342.9.

Chinese Patent Office, Chinese Office Action dated Dec. 19, 2022 in Application No. 202011441342.9.

* cited by examiner

CONDUCTIVE INK WITH ENHANCED MECHANICAL FATIGUE RESISTANCE

FIELD

The present disclosure relates to a conductive ink, and more particularly, to a conductive ink with greater mechanical fatigue resistance.

BACKGROUND

Heating elements for electrothermal deicers typically use etched alloys. The etching process can have an effect on material properties of a component, such as the mechanical properties, or the like. The etching process may remove metal from the surface of a part, which may have an effect on dimensional tolerances or the like. Additionally, chemical etching may be difficult to automate and/or have waste disposal issues.

SUMMARY

A conductive ink is disclosed herein. The conductive ink may comprise: a high melting temperature thermoplastic polyurethane (TPU), the high melting temperature TPU including a melting point between 120° C. (248° F.) and 200° C. (392° F.); and a plurality of conductive particles disposed in the high melting temperature TPU, the plurality of conductive particles comprising between 60% and 95% of the conductive ink by weight.

In various embodiments, the conductive ink may further comprise a free radical crosslinker. The free radical crosslinker may include peroxide. The plurality of conductive particles may include at least one of silver platelet particles and nanosilver. The plurality of conductive particles may include carbon nanotubes (CNT). The CNT may comprise between 70% and 85% of the conductive ink by weight.

A heating trace assembly is disclosed herein. The heating trace assembly may comprise: an insulator; a ceramic positive temperature coefficient (PTC) element coupled to the insulator, the ceramic PTC element extending along a length of the insulator; a first bus bar extending along the length of the insulator; and a second bus bar extending along the length of the insulator, the ceramic PTC element coupled to the first bus bar and the second bus bar.

In various embodiments, the ceramic PTC element is a thin film of ceramic PTC. The first bus bar may be a first conductive ink. The second bus bar may be a second conductive ink. The first conductive ink and the second conductive ink may each include: a high melting temperature thermoplastic polyurethane (TPU), the high melting temperature TPU including a melting point between 120° C. (248° F.) and 200° C. (392° F.); and a plurality of conductive particles disposed in the high melting temperature TPU, the plurality of conductive particles comprising between 60% and 95% of each conductive ink by weight. The first conductive ink and the second conductive ink may each include a free radical crosslinker. The plurality of conductive particles may include at least one of silver platelet particles and nanosilver. The insulator may include a first flexible substrate. The ceramic PTC element may be coupled to the first flexible substrate by an adhesive. The insulator may include a second flexible substrate, and the first bus bar and the second bus bar may be coupled to the second flexible substrate by an adhesive. The insulator may include a first flexible substrate, and the first bus bar and the second bus bar may be coupled to the first flexible substrate by an adhesive.

A method of manufacturing a conductive ink is disclosed herein. The method may comprise: mixing a high melting temperature thermoplastic polyurethane (TPU) with a plurality of conductive particles, the high melting temperature TPU including a melting point between 120° C. (248° F.) and 200° C. (392° F.), the plurality of conductive particles comprising between 60% and 95% of a resultant mixture; and curing the high melting temperature TPU and the plurality of conductive particles.

In various embodiments, the mixing may further comprise mixing at least one of a free radical crosslinker with the high melting temperature TPU and the plurality of conductive particles, and wherein curing further comprises heating the resultant mixture.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact.

Disclosed herein is a conductive ink for enhanced mechanical fatigue resistance. The conductive ink may comprise conductive particles and a high melting temperature polyurethane (TPU). In various embodiments, the conductive ink may further comprise a free radical crosslinker, such as peroxide The conductive ink may be configured for greater fatigue resistance performance in bending cycle fatigue tests.

Figure 1:
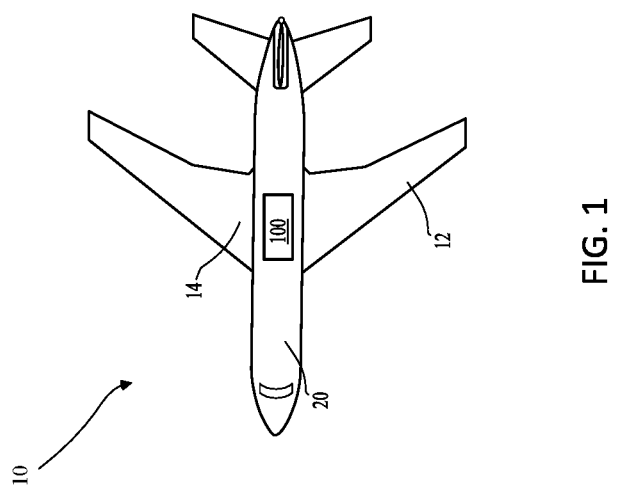
FIG. 1 illustrates a plain view showing an aircraft, in accordance with various embodiments.

With reference to FIG. 1, an aircraft 10 is provided with a fuselage 20, a left side wing 12 and a right side wing 14. The left side wing 12 and right side wing 14 are designed to provide lift to the aircraft and enable it to fly. The fuselage 20 may house passengers, as well as various components configured to operate aircraft 10. In various embodiments, the fuselage 20 may comprise a water system 100. Water system 100 may be a potable water system, a gray water system, or the like. Water system 100 may be disposed in an area of fuselage 20 that is susceptible to outside temperature control. As such, at high altitudes, water system 100 may be exposed to temperatures below freezing. Water system may be temperature controlled by an internal heating trace assembly.

Figure 2:
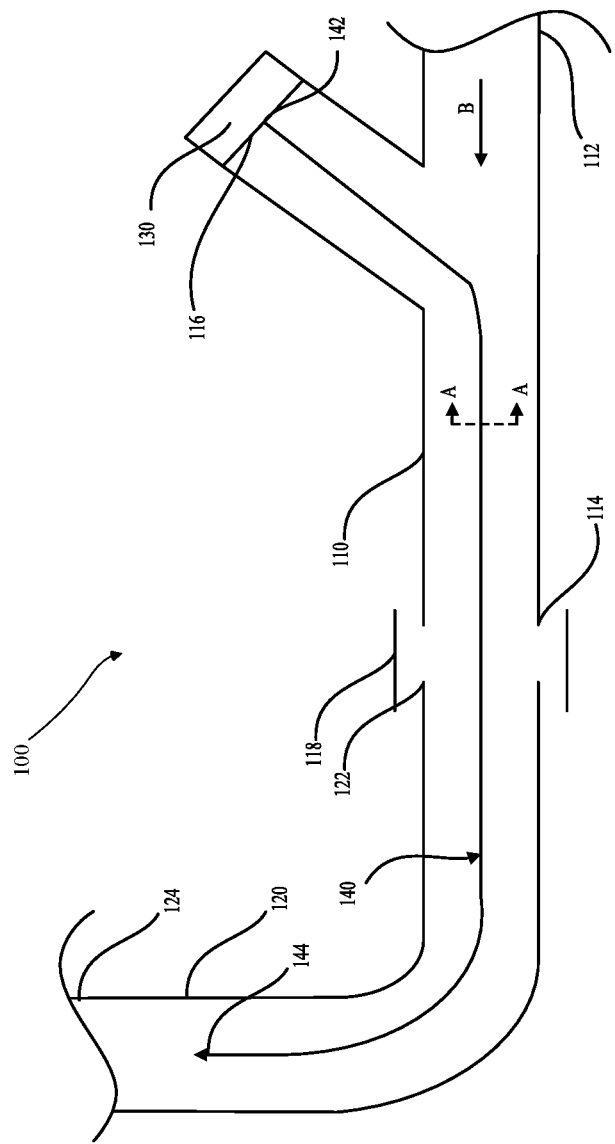
FIG. 2 illustrates a potable water system of an aircraft, in accordance with various embodiments.

Referring now to FIG. 2, a schematic view of a portion of a water system 100 for use on an aircraft 10, in accordance with various embodiments, is illustrated. The water system 100 comprises a first tube 110, a second tube 120, an electrical interface 130, and an internal heating trace assembly 140. The first tube 110 may comprise a wye shape, a tee shape, or the like. The first tube 110 may comprise a water inlet 112, a water outlet 114, and a heating trace inlet 116. The second tube 120 may comprise a water inlet 122 and a water outlet 124. The water inlet 122 of the second tube 120 may be coupled to the water outlet 114 of the first tube 110 by any method known in the art. For example, water inlet 122 of the second tube 120 may be coupled to the water outlet 114 of the first tube 110 by a coupling 118, such as two-ferrule fitting, a single ferrule fitting, a ferrule-less push-fit connector, a collar fitting, or the like. The water system 100 may flow in a first direction B from water inlet 112 from first tube 110 through water outlet 124 of second tube 120.

In various embodiments, electrical interface 130 is disposed at the heating trace inlet 116 of the first tube 110. The electrical interface 130 may be any electrical interface 130 known in the art, such as a junction box or the like. The electrical interface 130 may be in electrical communication with a controller and/or a monitoring system. The electrical interface 130 is coupled to the internal heating trace assembly 140. The internal heating trace assembly 140 is in electrical communication with the electrical interface 130. A first end 142 internal heating trace assembly 140 is fixed at the electrical interface 130 and the second end 144 is free within the water system 100. For example, second end 144 may be free in second tube 120 or an upstream tube in water system 100. The internal heating trace assembly 140 may be configured to control a temperature of water disposed in water system 100 during normal operation. In various embodiments, bus wires disposed in the internal heating trace assembly 140 may conduct current from the electrical interface 130 through the length of the internal heating trace assembly 140 during normal operation.

Although water system 100 is disclosed with respect to an aircraft 10, any water system with temperature control is within the scope of this disclosure.

Figure 3:
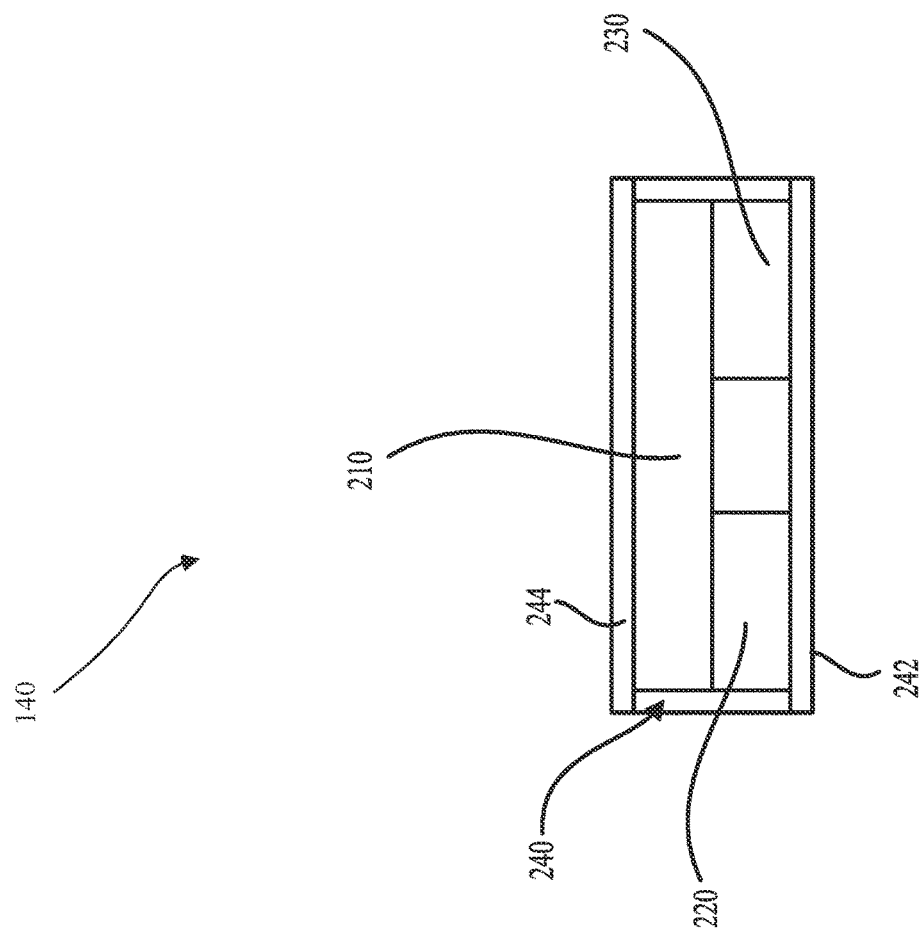
FIG. 3 illustrates a cross-sectional view of an internal heating trace assembly, in accordance with various embodiments.

Referring now to FIG. 3, a cross-sectional view of internal heating trace assembly 140 along section A-A from FIG. 2, in accordance with various embodiments, is illustrated. Internal heating trace assembly 140 comprises a ceramic Positive Temperature Coefficient (PTC) element 210, a first bus bar 220, a second bus bar 230, and an insulator 240. In various embodiments, the ceramic PTC element 210 may extend along the length of the internal heating trace assembly 140. The ceramic PTC element 210 may be disposed between, and coupled to, the first bus bar 220 and the second bus bar 230. In various embodiment, the ceramic PTC element is in electrical communication with the first bus bar 220 and the second bus bar 230. The first bus bar 220 and the second bus bar 230 may be any conductive element known in the art. For example, the first bus bar 220 and the second bus bar 230 may be a conductive ink as disclosed herein. The first bus bar 220 and the second bus bar 230 may be electrically coupled to the electrical interface 130 from FIG. 2. The first bus bar 220 and the second bus bar 230 may be configured to carry an electrical current in internal heating trace assembly 140.

In various embodiments, insulator 240 is disposed around the first bus bar 220, the second bus bar 230, and the ceramic PTC element 210. The insulator 240 may be any electrical insulator known in the art (e.g., polyethylene, cross linked polyethylene-XLPE, polyvinyl chloride PVC, Teflon, silicone, polyolefin, fluoropolymer, etc.). The insulator 240 may be configured to insulate the electricity generated from the first bus bar 220, the second bus bar 230, and the ceramic PTC element 210 from the water disposed in water system 100 from FIG. 2.

In various embodiments, an adhesive is disposed between the insulator 240 and the ceramic PTC element 210. In various embodiments, an adhesive is disposed between the insulator 240 and the first bus bar 220 and the second bus bar 230. The insulator 240 may include a first flexible substrate 242. In various embodiments, when the first bus bar 220 and the second bus bar 230 are conductive inks, the conductive inks are deposited on the first flexible substrate 242 running down the length of the flexible substrate 242. The first bus bar 220 and the second bus bar 230 are a thermoset-based ink, such as a silver conductor sold under the trademark DuPont® 5025 which is available from DuPont of Midland, Michigan, a conductor sold under the trademark Loctite® ECI 1010 E&C which is available from Henkel Corporation of Dusseldorf, Germany. In various embodiments, the ceramic PTC element 210 may include a thin film of ceramic PTC. In various embodiments, the thin film of ceramic PTC may be printed on the second flexible substrate 244 along the length of the second flexible substrate 244. In various embodiments, a liquid closeout may be coated on the second substrate 244 prior to printing the ceramic PTC element 210 and cured after the ceramic PTC element 210 is printed on the second substrate 244. In various embodiments, a solid film closeout of the PTC element 210 is bonded on with adhesive.

Figure 4:
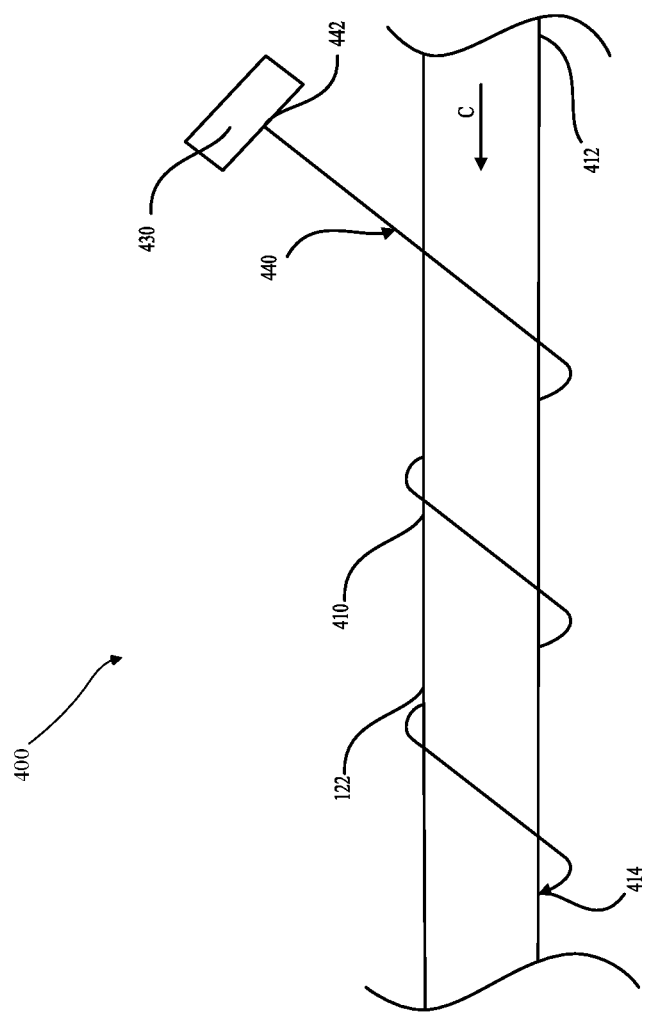
FIG. 4 illustrates a potable water system of an aircraft, in accordance with various embodiments.

Referring now to FIG. 4, a schematic view of a portion of a water system 400 for use on an aircraft 10, in accordance with various embodiments, is illustrated. The water system 400 comprises a tube 410, an electrical interface 430, and a heating trace assembly 440. The tube 410 may be configured to carry a fluid, such as gray water, or the like. The tube 410 may comprise a water inlet 412 and a water outlet 414. The water system 100 may flow in a first direction C from water inlet 412 from tube 410 through water outlet 114 of tube 410.

In various embodiments, electrical interface 430 is disposed proximate the tube 410. The electrical interface 430 may be any electrical interface 430 known in the art, such as an electrical connector or the like. The electrical interface 430 may be in electrical communication with a controller and/or a monitoring system. The electrical interface 430 is coupled to the heating trace assembly 440. The heating trace assembly 440 is in electrical communication with the electrical interface 430. A first end 442 internal heating trace assembly 440 is fixed at the electrical interface 430 and the second end 444 is fixed to an outer surface of tube 410. For example, second end 144 may be fixed to the outer surface of tube 410 by any method known in the art, such as an adhesive or the like. The heating trace assembly 440 may be configured to control a temperature of water disposed in water system 100 during normal operation. In various embodiments, bus wires disposed in the heating trace assembly 140 may conduct current from the electrical interface 430 through the length of the heating trace assembly 440 during normal operation.

Although water system 400 is disclosed with respect to an aircraft 10, any water system with temperature control is within the scope of this disclosure.

Figure 5:
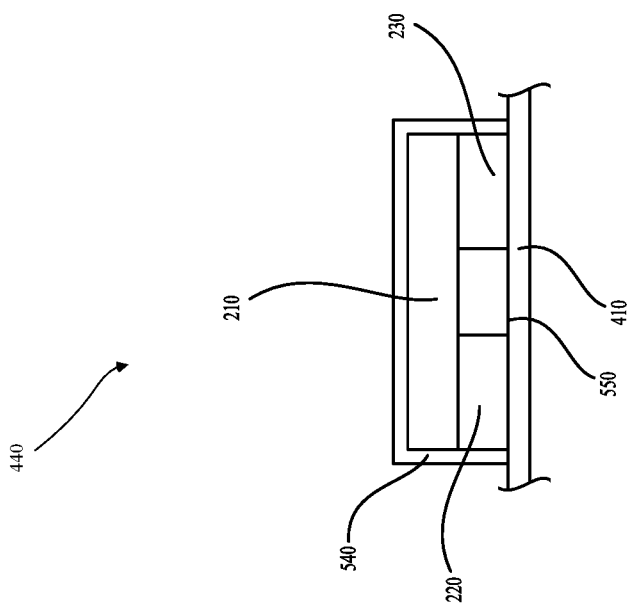
FIG. 5 illustrates a cross-sectional view of an internal heating trace assembly, in accordance with various embodiments.

Referring now to FIG. 5, a cross-sectional view of heating trace assembly 440 coupled to an outer surface of a tube, in accordance with various embodiments, is illustrated. Heating trace assembly 440 comprises a ceramic PTC element 210, a first bus bar 220, a second bus bar 230, and an insulator 240. In various embodiments, the ceramic PTC element 210 may extend along the length of the heating trace assembly 440. The ceramic PTC element 210 may be disposed between, and coupled to, the first bus bar 220 and the second bus bar 230. In various embodiment, the ceramic PTC element is in electrical communication with the first bus bar 220 and the second bus bar 230. The first bus bar 220 and the second bus bar 230 may be any conductive element known in the art. For example, the first bus bar 220 and the second bus bar 230 may be a conductive ink as disclosed herein. The first bus bar 220 and the second bus bar 230 may be electrically coupled to the electrical interface 430 from FIG. 4. The first bus bar 220 and the second bus bar 230 may be configured to carry an electrical current in internal heating trace assembly 140.

In various embodiments, insulator 240 is disposed around the first bus bar 220, the second bus bar 230, and the ceramic PTC element 210 and coupled to an outer surface 550 of tube 410. The insulator 540 may be any electrical insulator known in the art (e.g., polyethylene, cross linked polyethylene-XLPE, polyvinyl chloride PVC, polytetrafluorethylene (PTFE), silicone, polyolefin, fluoropolymer, etc.). The insulator 540 may be configured to insulate the electricity generated from the first bus bar 220, the second bus bar 230, and the ceramic PTC element 210 from external components in water system 400 from FIG. 4.

Figure 6:
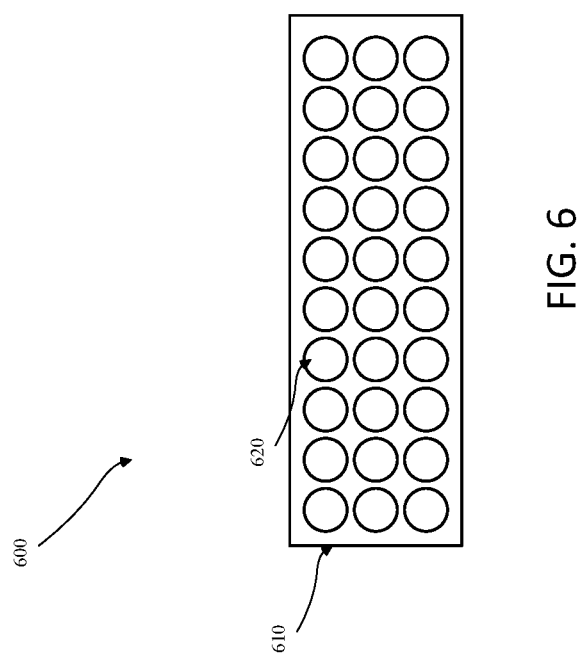
FIG. 6 illustrates a conductive ink, in accordance with various embodiments.

Referring now to FIG. 6, a conductive ink 600, in accordance with various embodiments, is illustrated. The conductive ink 600 may be configured for enhanced mechanical fatigue resistance. In various embodiments, first bus bar 220 and second bus bar 230 may comprise conductive ink 600. Although described with respect to an internal heating trace assembly 140, conductive ink 600 may be used for rotor blades and/or fixed wing electrothermal ice protection. For example, conductive ink 600 may be utilized as a bus bar for an electrothermal ice protection system in a rotor blade and/or fixed wing. By utilizing the conductive ink 600, the ice protection system may be more robust (i.e., the conductive ink may provide mechanical fatigue resistance during vibration of the rotor blade or fixed wing).

The conductive ink comprises a high melting temperature thermoplastic polyurethane (TPU) 610 and a plurality of conductive particles 620. A "high melting temperature TPU," as disclose herein is a TPU with a melting point between 120° C. (248° F.) and 200° C. (392° F.), or between 140° C. (284° F.) and 190° C. (374° F.), or between 140° C. (284° F.) and 185° C. (365° F.). In various embodiments, the high melting temperature TPU may be any high melting temperature TPU known in the art, such as that sold under the trademark Pearlbond® 960 EXP, Pearlbond® 95AB0 NAT, 021 Pearlbond® HMS EXP which is available from Lubrizol of Wickliffe, Ohio, USA, IROGRAN® A 98 P 4535 which is available from Huntsman Corporation of The Woodlands, Texas, USA, ELASTOLLAN® 785 A 10 HPM polyester, or the like.

In various embodiments, the plurality of conductive particles 620 may be any conductive particles known in the art. For example, the plurality of conductive particles may comprise silver particles, silver platelet particles, nanosilver, or any combination of the three. In various embodiments, the plurality of conductive particles 620 may comprise carbon nanotubes (CNT) graphene, or the like.

Figure 7:
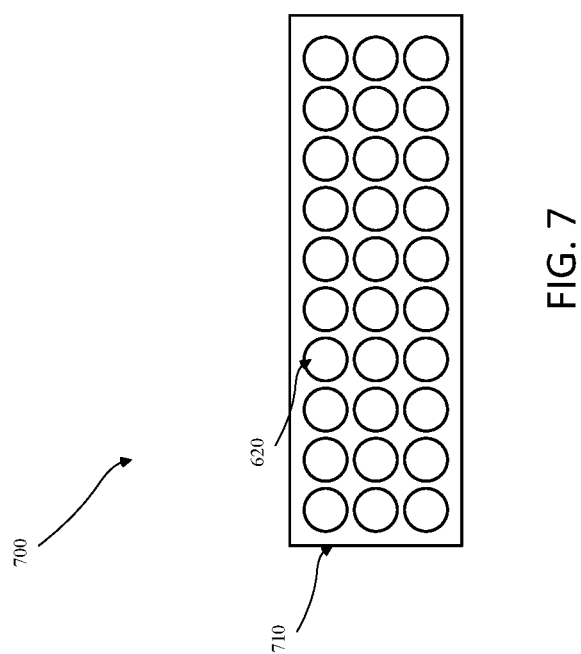
FIG. 7 illustrates a conductive ink, in accordance with various embodiments.

Referring now to FIG. 7, a conductive ink 700, in accordance with various embodiments, is illustrated. The conductive ink comprises mixture 710 and a plurality of conductive particles 620. In various embodiments, the mixture 710 includes a high melting temperature thermoplastic polyurethane (TPU) and a free radical cross linker, such as peroxide. In various embodiments, the conductive particles 620 may be disposed within the urethane elastomer.

In various embodiments, the conductive inks 600, 700 may comprise the plurality of conductive particles 620 in an amount of 60% to 95%, or between 65% and 90% by weight of the conductive ink. In various embodiments, when the conductive particles comprise CNT, the amount of CNT particles may be between 70% and 85%.

In various embodiments, the conductive inks 600, 700 may show provide enhanced fatigue resistance performance in four point bending cycle fatigue tests compared to chemical etching, or the like. The conductive inks 600, 700 may be used for external heated composite structures, such as rotor blades, fixed wings, faring, engine lip electrothermal ice protection, or the like.

Figure 8:
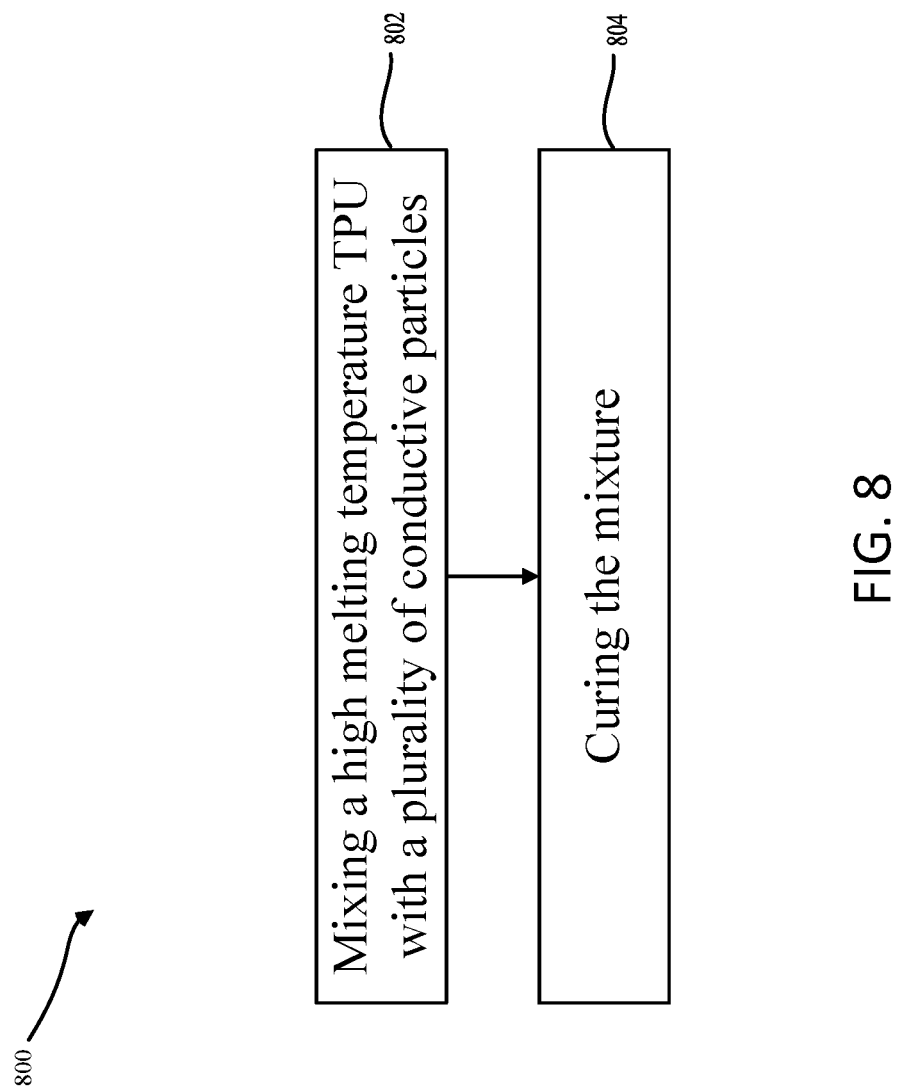
FIG. 8 illustrates a method of manufacturing a conductive ink, in accordance with various embodiments.

Referring now to FIG. 8, a method 800 for manufacturing a conductive ink, in accordance with various embodiments, is illustrated. The method 800 comprises mixing a high melting temperature TPU with a plurality of conductive particles (step 802). In various embodiments, the mixing may further comprise mixing a free radical crosslinker, such as peroxide. The mixture may be in accordance with conductive inks 600, 700, as disclosed above. The method may further comprise curing the mixture of high melting temperature TPU with the plurality of conductive particles (step 804). In various embodiments, the curing may comprise heating the mixture, resulting in crosslinking between the high melting temperature TPU and the free radical crosslinker. In various embodiments, the curing may comprise adding an additive which acts as a reinforcing agent and an adhesive promoter, such as titanium dioxide particles.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A water system for an aircraft, the water system comprising:
a first tube including a first inlet, a second inlet, and an outlet, the second inlet disposed between the first inlet and the outlet, the tube defining a longitudinal axis, wherein water is configured to flow in a direction defined by the longitudinal axis from the first inlet through the outlet;
a second tube coupled to the outlet of the tube;
an electrical interface disposed at the second inlet; and
a heating trace assembly disposed in the first tube and extending from a first longitudinal end to a second longitudinal end, the first longitudinal end coupled to the electrical interface, the second longitudinal end configured to float freely in the second tube during operation of the water system the heating trace assembly configured to control a temperature of water disposed in the water system during operation of the water system, at least a portion of the heating trace assembly extending in the direction defined by the longitudinal axis of the first tube, the heating trace assembly comprising:
an insulator;
a ceramic positive temperature coefficient (PTC) element coupled to the insulator, the ceramic PTC element extending along a length of the insulator;
a first bus bar extending along the length of the insulator; and
a second bus bar extending along the length of the insulator, the ceramic PTC element coupled to the first bus bar and the second bus bar, wherein:
the first bus bar is a first conductive ink, and wherein the second bus bar is a second conductive ink,
the first conductive ink and the second conductive ink each include:
a high melting temperature thermoplastic polyurethane (TPU),
a plurality of conductive particles disposed in the high melting temperature TPU, and
an additive configured to act as a reinforcing agent and an adhesive promoter, the additive including titanium dioxide particles.

2. The water system of claim 1, wherein the ceramic PTC element is a thin film of ceramic PTC.

3. The water system of claim 2, wherein:
the high melting temperature TPU including a melting point between 120° C. (248° F.) and 200° C. (392° F.); and
the plurality of conductive particles comprise between 60% and 95% of each conductive ink by weight.

4. The water system of claim 3, wherein the first conductive ink and the second conductive ink each include a free radical crosslinker.

5. The water system of claim 4, wherein the free radical crosslinker includes peroxide.

6. The water system of claim 3, wherein the plurality of conductive particles includes at least one of silver platelet particles and nanosilver.

7. The water system of claim 3, wherein the plurality of conductive particles includes carbon nanotubes (CNT).

8. The water system of claim 7, wherein the CNT comprises between 70% and 85% of the conductive ink by weight.

9. The water system of claim 1, wherein the insulator includes a first flexible substrate, wherein the ceramic PTC element is coupled to the first flexible substrate by an adhesive.

10. The water system of claim 1, wherein the insulator includes a second flexible substrate, and wherein the first bus bar and the second bus bar are coupled to the second flexible substrate by an adhesive.

11. The water system of claim 1, wherein the insulator includes a first flexible substrate, wherein the first bus bar and the second bus bar are coupled to the first flexible substrate by an adhesive.

\* \* \* \* \*